US006447026B2

(12) United States Patent
Palvoelgyi

(10) Patent No.: US 6,447,026 B2
(45) Date of Patent: Sep. 10, 2002

(54) ARRANGEMENT FOR CONNECTING TWO PIPES

(75) Inventor: Sandor Palvoelgyi, Gleisdorf (AT)

(73) Assignee: Tesma Motoren und Getriebetechnik GmbH, Weiz (AT)

( * ) Notice: Subject to any disclaimer, the term of this patent is extended or adjusted under 35 U.S.C. 154(b) by 0 days.

(21) Appl. No.: 09/769,117

(22) Filed: Jan. 24, 2001

(51) Int. Cl.[7] ............................................ F16L 19/028

(52) U.S. Cl. .................... 285/354; 285/903; 285/334.5

(58) Field of Search ................................ 285/354, 903, 285/334.5

(56) References Cited

U.S. PATENT DOCUMENTS 2,458,817 A * 1/1949 Wolfram .................... 285/354
3,092,404 A * 6/1963 MacWilliam ............... 285/354
3,751,002 A * 8/1973 Folkerts et al. .......... 285/334.4
4,462,620 A * 7/1984 Bambenek et al.
4,630,850 A * 12/1986 Saka ......................... 285/903
4,674,775 A * 6/1987 Tajima et al. ............... 285/354
4,754,995 A * 7/1988 Takahashi et al. .......... 285/353
4,805,944 A * 2/1989 Reginaldo .................. 285/354
5,080,405 A * 1/1992 Sasa et al. .................. 285/903
5,466,016 A * 11/1995 Briody et al.
5,581,862 A * 12/1996 Choma et al.
5,799,989 A * 9/1998 Albino .................... 285/334.5
5,857,716 A * 1/1999 Thomas ...................... 285/903
5,893,591 A * 4/1999 Ebel et al. ................. 285/354
6,019,127 A * 2/2000 Orita et al.
6,036,237 A * 3/2000 Sweeney .................... 285/903
6,082,783 A * 7/2000 Kawasaki et al. .......... 285/321

FOREIGN PATENT DOCUMENTS

EP 0926415 * 6/1999

* cited by examiner

*Primary Examiner*—Eric K. Nicholson
(74) *Attorney, Agent, or Firm*—Clark Hill PLC

(57) ABSTRACT

An arrangement involving a screw connection for connecting two pipes. The arrangement has particular application for connecting a fuel filler pipe to a pipe that is connected to a fuel tank of a motor vehicle. At least one O-ring seal with excellent permeation resistance is clamped in between a resilient ring-shaped collar of a first pipe and an inner cone of a second pipe using a screw connection.

17 Claims, 1 Drawing Sheet

ARRANGEMENT FOR CONNECTING TWO PIPES

BACKGROUND OF THE INVENTION

The invention relates to a structure or arrangement for connecting two pipes, and in particular, for connecting a fuel filler pipe to a fuel tank pipe of a motor vehicle.

Well-known and widely used pipe connections include arrangements wherein one pipe has an external thread in the connection area that a screw cap or nut located on a second pipe screws onto.

A motor vehicle usually includes a fuel tank and a conduit for introducing liquid fuel into the fuel tank, commonly referred to as a fuel filler pipe. The connection between the filler pipe and the fuel tank usually involves two pipes, one end of the filler pipe and another pipe that is welded or otherwise secured to the fuel tank. It is a well-known practice to slide a flexible filler hose or sleeve over the two adjoining pipe ends and introduce a surrounding hose clamp in order to connect the two pipes. This flexible sleeve is commonly made of rubber or other material with suitable heat resistance and weatherability. However, rubber is permeable to hydrocarbon fumes, so the rubber sleeve absorbs fuel over time, leading to unpleasant odors, and more importantly, the release of toxic hydrocarbon fumes into the surrounding atmosphere. Furthermore, a need also exists in other applications for a tight connection of two pipes that is impermeable to both gases and liquids.

Therefore, an object of the invention is to provide an arrangement for a connection of two pipes that is impermeable to fluids and, as much as possible, to gases such as hydrocarbon fumes.

Other objects and advantages of the present invention will become apparent from the following detailed description of the invention when considered in conjunction with the accompanying drawing.

SUMMARY OF THE INVENTION

The invention provides a ring seal, which can be clamped in between a flexible ring-shaped collar of one pipe and an inner cone of a second pipe by means of a screw connection. Any potential permeation of vapors or gases, in particular hydrocarbon vapors emanating from the fuel, is limited to the very small surface area of the ring seal which is in contact with the external environment.

The flexible ring-shaped collar increases the impermeability of the entire arrangement. This flexibility can be achieved by designing the ring-shaped collar with two flanks that are resilient against each other.

To achieve a perfect fit and protect against slipping, the front transitional area between the ring-shaped collar and the pipe provides a bearing surface for an O-ring seal.

The screw connection includes a connecting nut that is held by the ring-shaped collar of one pipe and a threaded part that is located on the other pipe.

In one possible embodiment, the threaded part is a plastic part that is injection-molded directly onto the pipe. In another embodiment, the threaded part is a metal part that is pressed onto the pipe. Both embodiments allow the threaded part to be easily produced and attached.

To ensure a tight screw connection, the threaded part must be attached tightly. For this purpose, the threaded part is held in an interlocking manner at the pipe, in particular by means of ribs or other similar means, at the circumference of the pipe.

DETAILED DESCRIPTION OF THE INVENTION

Figure 1:
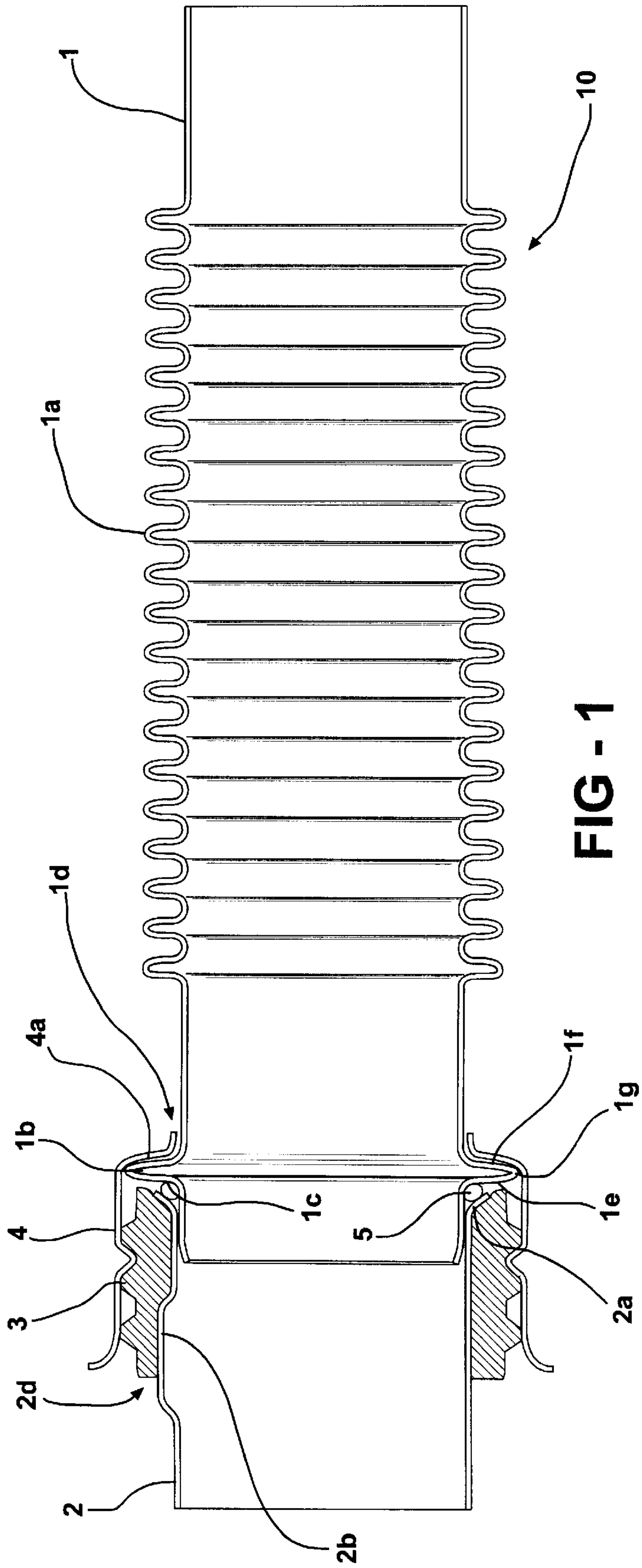
FIG. 1 shows a longitudinal cross-section through two pipes in the connection area.
Figure 2:
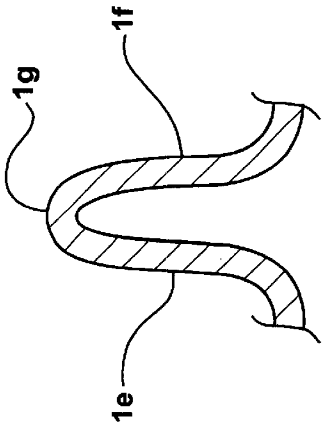
FIG. 2 shows an enlarged view of the flexible collar.

As illustrated in FIG. 1, a pipe assembly according to this invention is generally shown at 10. It should be appreciated that while the pipe assembly 10 is described as being particularly applicable to usage with a motor vehicle fuel tank, the pipe assembly may be used in any suitable application. The pipe assembly 10 includes a first pipe 1 and a second pipe 2 in fluid communication with the first pipe 1. Both pipes 1, 2 are made of metal, preferably stainless steel, whereby one pipe (pipe 2 is shown on the left side of FIG. 1) is welded or otherwise secured to the fuel tank (not illustrated), and the other pipe (pipe 1, located on the right side of FIG. 1) provides the connection to a fuel filler nozzle (also not illustrated). Pipes 1, 2 have nearly identical inner and outer diameters as well as wall thicknesses. In the illustrated embodiment, pipe 1 is equipped with a convoluted section 1*a* near its end for improved flexibility, to allow for easier handling when connecting the two pipes 1, 2.

The end segments 1*d*, 2*d* of the two pipes 1, 2, which form the connection area, have a special design. Pipe 1 has a flexible ring-shaped bead or collar 1*b*, which surrounds a portion of an end segment 1*d*. The collar 1*b* has two sides or flanks 1*e* and 1*f*. Each flank 1*e*, 1*f* has rounded sections, which extend from pipe 1. The flanks 1*e*, 1*f* are generally parallel to and spaced apart from each other. The flanks 1*e*, 1*f* are interconnected by a spring portion 1*g*, which allows one of the flanks 1*e*, 1*f* to be elastically displaced relative to the other of the flanks 1*e*, 1*f*. The two flanks are designed and located at such a distance from one another so that the ring-shaped collar 1*b* is elastic and flexible in the axial direction. The rounded section in the transitional area of the front flank of ring-shaped collar 1*b*, which is facing the free end of the pipe, forms a bearing surface 1*c* for a sealing member or an O-ring seal 5. The seal 5 may be made from rubber or plastic, and has good resistance to permeation.

The end segment 2*d* of pipe 2 expands to a conical shape at its end, forming an inner cone 2*a* which provides the location for the O-ring seal 5 at pipe 2. A threaded part 3 having an external thread is located on the outside of end segment 2*d* of pipe 2. This external thread is secured by several molded ribs 2*b*, which extend outward from the end segment of the pipe 2*d* in the radial and axial directions.

The threaded part 3 may consist of plastic and may be injection molded onto the end segment 2*d* of pipe 2 by using an appropriate and well-known insert molding technique. In this case, ribs 2*b* are pre-molded. Alternatively, threaded part 3 may also consist of metal, for example, zinc or bronze. In this case, threaded part 3 slides over and onto pipe 2 and its position is fixed by means of ribs 2*b* which are subsequently molded in the corresponding indentations on the threaded part 3.

A connecting nut 4 is located on the end segment 1*d* of pipe 1. This nut is held by an edge area or inwardly extending flange 4*a* which surrounds and engages a portion of the flank 1*f* of the ring-shaped collar 1*b*. A thread located on connecting nut 4 engages with the external thread of the threaded part 3. Therefore, rotation of the connecting nut 4 compresses the O-ring seal 5 between its bearing surface 1*c* and the inner cone 2*a* and therefore ensures that the connection area is sealed. The sealing function is improved by the resiliency of the flanks of ring-shaped collar 1*b*, which deflect slightly during the screwing process.

This pipe connection, which can be reversed if necessary, is particularly suitable for connecting pipes, which carry any media that require gas-impermeable connection methods. The invention is therefore not restricted to pipes that carry fuel.

Alternatively, the thread part may carry a simple annular groove and the nut has a complementary projection disposed in the groove. In this arrangement the nut simply snaps or clips on the threaded part.

It should also be appreciated that a groove whether in the form of a simple annular groove or in the form of a continuous thread may be form directly on the pipe 2.

I claim:

1. A pipe assembly comprising:

a first pipe having a first end segment and a flexible collar extending from and around a portion of said first end segment;

a second pipe having a second end segment, said second end segment being adjacent said first end segment and in fluid communication with said first end segment;

a sealing member disposed between said collar and said second end segment for providing a fluid seal between said pipes; and a connection means for interconnecting said pipes such that said sealing member is resiliently clamped between said collar and said second end, wherein said connection means includes a groove surrounding an external portion of said second end segment and a connecting nut coupled to said second pipe, said nut having an end adjacent said collar and a flange extending radially inward from said end, said flange engaging said collar so as to elastically deform said collar such that said sealing member is elastically clamped between said collar and said second end segment, and wherein said connection means includes a threaded part fixed to and surrounding at least a portion of said second end segment, said threaded part having an external surface, wherein said groove is formed in said external surface of said threaded part.

2. A pipe assembly according to claim 1, wherein said flexible collar includes a first flank extending from said first pipe, a second flank extending from said first pipe apart from and generally parallel to said first flank, and a spring portion interconnecting said flanks for allowing elastic displacement of one of said flanks relative to the other of said flanks.

3. A pipe assembly according to claim 2, wherein said first flank has a rounded section between said first end segment and said spring portion for providing a bearing surface for said sealing member.

4. A pipe assembly according to claim 2, wherein said spring portion has a generally semicircular shape.

5. A pipe assembly according to claim 1, wherein said second end segment has a conical-shaped portion acting as a bearing surface for said sealing member.

6. A pipe assembly according to claim 1, wherein said nut includes a projection disposed in said groove for coupling said nut to said second pipe.

7. A pipe assembly according to claim 6, wherein said groove forms a continuous thread and said projection forms a continuous tread complementary to said groove such that said nut is coupled to said second pipe by a screwing action.

8. A pipe assembly according to claim 1, wherein said threaded part is a plastic part that has been molded directly onto said second pipe.

9. A pipe assembly according to claim 1, wherein said threaded part is a metal part that has been pressed onto said second pipe.

10. A pipe assembly according to claim 1, wherein said second pipe includes a rib formed thereon and said threaded part has a complementary channel for receiving said rib such that said threaded part is held in an interlocking manner on said second pipe.

11. A pipe assembly according to claim 1, wherein one of said pipes is adapted for connection to a fuel tank.

12. A fuel tank assembly for a motor vehicle, comprising:

a fuel tank;

a metallic tank pipe having and tank end segment attached to said fuel tank and a second end segment opposite said tank end segment and external to said tank;

a metallic fuel filler pipe in fluid communication with said tank pipe, said filler pipe having a first end segment adjacent said second end segment, a filler end segment accessible from the outside of said vehicle, and a flexible collar extending from and around a portion of said first end segment;

an elastic sealing member disposed between said collar and said second end segment for providing a fluid seal between said pipes; and a connection means for interconnecting said pipes such that said sealing member is resiliently clamped between said collar and said second end, wherein said connection means includes a groove surrounding an external portion of said second end segment and a connecting nut coupled to said second pipe, said nut having an end adjacent said collar and a flange extending radially inward from said end, said flange engaging said collar so as to elastically deform said collar such that said sealing member is elastically clamped between said collar and said second end segment, and wherein said connection means includes a threaded part fixed to and surrounding at least a portion of said second end segment, said threaded part having an external surface, wherein said groove is formed in said external surface of said threaded part.

13. A fuel tank assembly according to claim 12, wherein said flexible collar includes a first flank extending from said first pipe, a second flank extending from said first pipe apart from and generally parallel to said first flank, and a spring portion interconnecting said flanks for allowing elastic displacement of one of said flanks relative to the other of said flanks.

14. A fuel tank assembly according to claim 13, wherein said first flank has a rounded section between said first end segment and said spring portion for providing a bearing surface for said sealing member.

15. A fuel tank assembly according to claim 13, wherein said spring portion has a generally semicircular shape.

16. A fuel tank assembly according to claim 12, wherein said nut includes a projection disposed in said groove for coupling said nut to said second pipe.

17. A fuel tank assembly according to claim 16, wherein said groove forms a continuous thread and said projection forms a continuous tread complementary to said groove such that said nut is coupled to said second pipe by a screwing action.

* * * * *

UNITED STATES PATENT AND TRADEMARK OFFICE
CERTIFICATE OF CORRECTION

PATENT NO. : 6,447,026 B2 
DATED : September 10, 2002
INVENTOR(S) : Palvoelgyi

It is certified that error appears in the above-identified patent and that said Letters Patent is hereby corrected as shown below:

Column 1,
Line 37, delete “drawing” and insert -- drawings -- therefor;

Column 3,
Line 16, delete “form” and insert -- formed -- therefor; and

Column 4,
Line 16, delete “and” and insert -- an -- therefor.

Signed and Sealed this

Fourth Day of February, 2003

JAMES E. ROGAN
*Director of the United States Patent and Trademark Office*